United States Patent
Taylor et al.

(10) Patent No.: US 12,137,692 B2
(45) Date of Patent: Nov. 12, 2024

(54) METHOD OF PREPARATION OF ANTIMICROBIAL POROUS MATERIAL

(71) Applicant: HYDRODYNE SYSTEMS LTD, Chesterfield (GB)

(72) Inventors: Alan Taylor, Chesterfield (GB); Eric Taylor, Chesterfield (GB)

(73) Assignee: Hydrodyne Systems Ltd, Chesterfield (GB)

(*) Notice: Subject to any disclaimer, the term of this patent is extended or adjusted under 35 U.S.C. 154(b) by 185 days.

(21) Appl. No.: 17/725,115

(22) Filed: Apr. 20, 2022

(65) Prior Publication Data

US 2022/0338478 A1 Oct. 27, 2022

(30) Foreign Application Priority Data

Apr. 21, 2021 (GB) .................................. 2105678

(51) Int. Cl.
| | | |
|---|---|---|
| *A01N 59/16* | (2006.01) | |
| *A01N 25/08* | (2006.01) | |
| *A01N 25/10* | (2006.01) | |
| *A01N 25/24* | (2006.01) | |
| *A01P 1/00* | (2006.01) | |

(52) U.S. Cl.
CPC ............. *A01N 59/16* (2013.01); *A01N 25/08* (2013.01); *A01N 25/10* (2013.01); *A01N 25/24* (2013.01); *A01P 1/00* (2021.08)

(58) Field of Classification Search
CPC ........ A01N 59/16; A01N 25/08; A01N 25/10; A01N 25/24; A01P 1/00
USPC ..................................................... 427/255.12
See application file for complete search history.

(56) References Cited

U.S. PATENT DOCUMENTS

| | | | | |
|---|---|---|---|---|
| 7,344,726 B2 * | 3/2008 | Taylor | .................... | A01N 59/16 |
| | | | | 424/617 |
| 9,610,378 B2 * | 4/2017 | Ryu | ........................ | A61L 15/44 |
| 10,259,915 B2 * | 4/2019 | Lienkamp | ............. | C08G 61/12 |
| 2013/0295315 A1 * | 11/2013 | Durdag | ................ | D04H 1/4326 |
| | | | | 442/381 |
| 2015/0351851 A1 * | 12/2015 | Deselle | .................. | A61B 46/40 |
| | | | | 600/490 |
| 2021/0000105 A1 * | 1/2021 | Wang | ..................... | A01N 25/08 |

FOREIGN PATENT DOCUMENTS

| | | | |
|---|---|---|---|
| CN | 1406485 | 4/2003 | |
| CN | 101297976 | 11/2008 | |
| CN | 204662150 | 9/2015 | |
| CN | 106177966 | 12/2016 | |
| CN | 107517961 | 12/2017 | |
| CN | 107670506 | 2/2018 | |
| CN | 111499929 | 8/2020 | |
| WO | WO-0049219 A1 * | 8/2000 | ............. A01N 25/34 |
| WO | 02/15698 | 2/2002 | |

OTHER PUBLICATIONS

United Kingdom Intellectual Property Office Search Report, dated Oct. 21, 2021, in connection with United Kingdom Application No. GB2105678.3 (2 pages).

* cited by examiner

*Primary Examiner* — Brian K Talbot
(74) *Attorney, Agent, or Firm* — Klintworth & Rozenblat IP LLP

(57) ABSTRACT

The present invention also provides two methods of preparing the antimicrobial preparation comprising the steps of submerging the porous material in vacuum vessel containing a solution comprising 1% to 4% of silver-chitosan dissolved in an organic acid; applying a vacuum to the vacuum vessel to displace air from the porous material; removing the vacuum from the vacuum vessel to return it to atmospheric pressure and then either drying the material and coating the material with a crosslinking solution or heating the material to between 120° C. and 140° C.

14 Claims, No Drawings

METHOD OF PREPARATION OF ANTIMICROBIAL POROUS MATERIAL

CROSS REFERENCE TO RELATED APPLICATIONS

The present application claims priority to and benefit of Taylor, United Kingdom Patent Application No. GB2105678.3, filed on Apr. 21, 2021. The entire contents of this application are incorporated herein by reference.

FIELD OF THE INVENTION

The present invention relates to an antimicrobial porous material that can be used in antimicrobial filters that could be used, for example, to treat water supplied to swimming pools, hot tubs, and other similar water bodies.

BACKGROUND TO THE INVENTION

Silver is known as a strong inorganic antimicrobial agent and silver nanoparticles are commonly used as a coating or impregnated into medical dressings. Silver acts to kill bacteria by inactivating enzymes and dysfunctioning bacterial cell membranes. Silver chitosan is a complex of silver and chitosan polymer. The polymer acts to immobilise silver nanoparticles and prevent agglomeration of the particles and improve the biocompatibility of the silver. A silver chitosan powder having contact biocidal properties and a method of producing that powder is described in EP 1312262. Silver chitosan has been investigated used in antimicrobial applications, for example the powder has been included in polymeric materials. However, including silver chitosan powder in polymeric material encapsulates the majority of the silver chitosan and provides little or no antimicrobial activity at the surface of the material.

Antimicrobial filters are often used to filter water, such as in hot tubs, swimming pools, or other bodies of water that might be contaminated with bacteria or other microbes and that require cleaning. There are also antimicrobial filters in filters for the treatment of drinking water and the present invention equally relates to such filters and any other water filter. There is a desire to use silver chitosan in antimicrobial filters. However, to date, there has been no effective way to utilise silver chitosan in an antimicrobial filter. In particular, the nature of silver chitosan as a water soluble powder material makes it unsuitable for use in water filters. Chitosan as a filter material on its own is unsuitable primarily due to the typical size distribution of particles. The particles are generally in the 100 to 200 μm size range, which makes for poor flow characteristics and makes the material even more difficult to backwash clean.

SUMMARY OF THE INVENTION

The present invention provides a method of coating a porous material with cross-linked silver-chitosan. This can be used to provide an antimicrobial material.

The Applicant has discovered a method of coating porous materials with silver-chitosan in a manner that prevents it from being washed away by water passing through the porous material. In particular, by processing a porous material according to a method of the present invention, as discussed below and defined in the claims, an antimicrobial material consisting of a porous material coated with silver-chitosan is produced. Water passing through the antimicrobial material is brought into contact with the silver chitosan coating and undergoes antimicrobial treatment. The silver-chitosan is cross-linked and this prevents it dissolving or being washed away when water is passed through the porous material. The cross-linking also retains the silver chitosan on the surface of the porous material, ensuring the silver chitosan is exposed to water passing over the surface.

The porous material used in the method of the present invention may be substantially any material that is sufficiently porous to be used as a filter material and that can be processed according to a method of the present invention, as discussed below and defined in the claims. Suitable porous materials include, but are not limited to, pumice, porous zeolite material, activated carbon in granular or pellet form, and porous ceramics. This list is not intended to be exhaustive and it is expected that the skilled person will be able to determine through simple experimentation whether any porous material is suitable for the present invention.

Unless indicated otherwise, all percentage compositions set out in the present specification are defined by percentage weight.

The antimicrobial material produced by the method of the present invention may be used for any suitable use, for example as a filter in an antimicrobial filter for use in swimming pools, hot tubs, or similar apparatus. The present invention also provides an antimicrobial filter comprising the antimicrobial material of the present invention.

The antimicrobial material produced by the method of the present invention has been found to be significantly advantageous in that it can act to precipitate and flock organic material dissolved or suspended in a water source and also enables a humic acid contaminated water source to be cleaned and sterilised simultaneously. It is anticipated that this makes the antimicrobial material of the present invention is useful as a filter in drinking water applications, swimming pools and spas, cooling tower filtration systems where high organic loads and/or warm conditions lead to E coli and legionella growth. The antimicrobial material of the present invention is also highly effective for the removal of complexed metals in water.

The present invention provides a first method of coating a porous material with cross-linked silver-chitosan comprising the steps of:
 a) submerging the porous material in vacuum vessel containing a solution comprising 1% to 4% of silver-chitosan dissolved in an organic acid;
 b) applying a vacuum to the vacuum vessel to displace air from the porous material;
 c) removing the vacuum from the vacuum vessel to return it to atmospheric pressure;
 d) drying the porous material; and
 e) covering the porous material with a crosslinking solution comprising between 1% and 50% glutaraldehyde.

The method is advantageous as it produces an antimicrobial material as discussed above.

The silver-chitosan used for the present invention may be prepared in any manner apparent to the person skilled in the art. In embodiments of the invention the silver-chitosan solution may be prepared using the solution prepared by photochemically developing the silver onto the chitosan in the solution as disclosed in U.S. Pat. No. 7,344,726 B dated 18 Mar. 2008. This method of preparing silver-chitosan solution is particularly suitable for high volume production. Alternatively, the solution may be prepared directly from silver-chitosan powder.

Step (c) of the method: removing the vacuum from the vacuum vessel to return it to atmospheric pressure has the effect of drawing the solution of silver-chitosan into the porous material.

In step (e) of the first method of the present invention set out above the porous material may be covered with the cross-linking solution in any manner apparent to the skilled person. In embodiments of the first method of the present invention the porous material may be sprayed with the crosslinking solution in step (e). In alternative embodiments of the first method of the present invention the porous material may be washed with the crosslinking solution in step (e).

The crosslinking solution may comprise between 1% and 50% of glutaraldehyde. This has been found to effect a 25 to 50% amine group crosslinking effect in the silver chitosan. Advantageously, the cross-linking solution comprises between 3% and 7% glutaraldehyde. This has been found to provide effective crosslinking of the silver chitosan without requiring excessive glutaraldehyde. For full crosslinking of the silver chitosan it is generally necessary to provide 0.1 moles of glutaraldehyde per mole of chitosan. However, full crosslinking is not always required. Providing 0.01 moles of glutaraldehyde per mole of silver chitosan has been found to provide sufficient crosslink to prevent redissolving of the silver chitosan on the surface of porous material thereby preventing the silver chitosan washing out in solution during use of the coated material as, for example, an antimicrobial filter.

In step (e) of the first method of the present invention the porous material should be left after being covered with the crosslinking solution for a sufficient amount of time to allow the silver-chitosan to cross-link. For example, it may be preferable to leave the porous material covered in crosslinking solution for at least 12 hours, more preferably 24 hours, before further processing.

The present invention also provides A method of coating a porous material with cross-linked silver-chitosan comprising the steps of:
submerging the porous material in vacuum vessel containing a solution comprising 1% to 4% of silver-chitosan dissolved in an organic acid and between 1% and 50% of glutaraldehyde; applying a vacuum to the vacuum vessel to displace air from the porous material; removing the vacuum from the vacuum vessel to return it to atmospheric pressure; and drying the porous material.

That is the glutaraldehyde may be included with the silver-chitosan solution before it is vacuum coated onto the porous material. This method may have any feature of the previous method set out above. This includes, but is not limited to, the amount of glutaraldehyde in the solution. In an embodiment of the present method the solution may comprise 15 g of 50% glutaraldehyde per 1000 g of 1% silver-chitosan solution.

The present invention also provides a second method of coating a porous material with cross-linked silver-chitosan comprising the steps of:
a) submerging the porous material in vacuum vessel containing a solution comprising 1% to 4% of silver-chitosan dissolved in an organic acid;
b) applying a vacuum to the vacuum vessel to displace air from the porous material;
c) removing the vacuum from the vacuum vessel to return it to atmospheric pressure; and
d) heating the porous material to a temperature between 120° C. and 140° C.

In contrast to the first method of the invention, it has been surprisingly found, that heating the porous material to between 120° C. and 140° C. acts to effectively crosslink the silver chitosan on the surface of the porous material in a similarly effective manner to using a crosslinking agent, without the need for a crosslinking agent.

Advantageously, in step (e) of the second method of the present invention the porous material is heated to a temperature between 130° C. and 140° C. This appears to be the optimum temperature for crosslinking the silver chitosan, particularly if the porous material is pumice. Temperatures above 140° C. are approaching the degradation point for chitosan and so are not effective in crosslinking the chitosan. In addition, temperatures above 140° C. have been found to produce a brown leachate when water is passed through the antimicrobial material. Temperatures below 120° C. do not appear to be sufficient to fully crosslink the silver chitosan. When heated to below 120° C. a visible leachate of silver chitosan is produced when water is passed through the antimicrobial material.

In step (e) of the second method of the present invention the porous material should be heated for a sufficient period of time to effect a 25 to 50% amine group crosslinking effect in the silver chitosan. It is believed that heating for at least 30 minutes is required, although heating for at least one hour is preferable to ensure that sufficient crosslinking occurs.

As set out above, suitable porous materials for the first and second methods of the present invention include, but are not limited to, pumice, porous zeolite material, activated carbon in granular or pellet form, and porous ceramics. This list is not intended to be exhaustive and it is expected that the skilled person will be able to determine through simple experimentation whether any porous material is suitable for the present invention.

The silver chitosan solution of the present invention may be any suitable solution, for example any solution used in the production of silver chitosan powder is likely to be suitable for use in the present invention. In embodiments of the methods of the present invention the silver chitosan solution may be a solution of silver chitosan dissolved in a suitable organic acid, such as citric, acetic or lactic acid. The amount of silver chitosan in the solution may be between 0.5% and 4%, for example 1%. Optionally, the silver chitosan solution may comprise a wetting agent, for example a non-ionic surfactant. A wetting agent will help the solution coat the surface of the porous material.

Any of the methods of the present invention may advantageously further comprise a pre-treatment of the porous material prior to step (a). The pre-treatment may comprise the steps of:
  i) covering the porous material with an alkaline solution in a vacuum vessel;
  ii) applying a vacuum to the vacuum vessel;
  iii) removing the porous material from the vessel and drying.

The pre-treatment of the porous material with an alkaline acts as a pre-neutralisation stage for the silver chitosan solution with which the porous material is subsequently coated. In particular, the alkaline solution neutralises the organic acid in the silver chitosan solution, which maintains the silver chitosan in solution thereby effecting the precipitation of the silver chitosan on the surface of the porous material. Any suitable alkaline solution may be used for pre-treatment of the porous material including but not limited to NaOH or sodium bicarbonate solution.

The drying of the porous material at step (iii) may be carried at any suitable temperature for any suitable length of time. In embodiments of the invention the porous material is carried out for at least 30 minutes at a temperature greater than 50° C., although shorter times and/or higher temperatures can be used. In embodiments of the invention the porous material may be dried at step (iii) for 12 hours at 60° C.

Any of the methods of the present invention may advantageously further comprise a method a post-treatment step after the final step of the method, the post-treatment comprising the steps of:
  i) covering the porous material with an alkaline solution;
  ii) drying the porous material.

The alkaline solution may be any suitable alkaline solution including but not limited to NaOH solution or sodium bicarbonate solution.

The post-treatment of the porous material with an alkaline acts as a neutralisation stage for the silver chitosan. In particular, the NaOH neutralises any organic acid in the silver chitosan solution. Any suitable alkaline solution may be used for pre-treatment of the porous material including but not limited to NaOH or sodium bicarbonate solution.

The drying of the porous material at step (ii) may be carried at any suitable temperature for any suitable length of time. In embodiments of the invention the porous material is carried out for at least 30 minutes at a temperature greater than 50° C., although shorter times and/or higher temperatures can be used. In embodiments of the invention the porous material may be dried at step (ii) for 12 hours at 60° C.

The post-treatment step may be in addition, or as an alternative to, any pre-treatment step using an alkaline solution.

Further features and advantages of the invention will be apparent from the examples of embodiments of the invention set out below.

EXAMPLE 1

A first example of a material according to the present invention prepared according to a method according to the present invention is as follows.

A 250 g 1% solution of silver chitosan dissolved in lactic acid with the addition of a non-ionic wetting agent is provided in a vessel capable of withstanding a full or partial vacuum. 200 g of pumice is added to the solution such that it is just fully submerged. A vacuum is applied to the vessel sufficient to displace all air from the pumice and replace it with the silver chitosan solution. Atmospheric pressure is then reapplied to the vessel. The pumice is then removed from the vessel. If necessary, the silver chitosan solution can then be topped up and the process can then be repeated with a further addition of pumice or zeolite.

After removal from the vacuum vessel the pumice is dried and then, either whilst damp or when fully dry, it is sprayed with a 3% solution of glutaraldehyde and left to dry for 24 hours. This acts to crosslink the silver chitosan on the surface of the pumice and render it insoluble.

A second example of a material according to the present invention prepared according to a method according to the present invention is as follows.

250 g of a 1% solution of silver chitosan dissolved in lactic acid with the addition of anon-ionic wetting agent is provided in a vessel capable of withstanding a full or partial vacuum. 200 g of pumice is added to the solution such that it is just fully submerged. A vacuum is applied to the vessel sufficient to displace all air from the pumice and replace it with the silver chitosan solution. Atmospheric pressure is then reapplied to the vessel. The pumice is then removed from the vessel. If necessary, the silver chitosan solution can then be topped up and the process can then be repeated with a further addition of pumice or zeolite.

After removal from the vacuum vessel the pumice is heated to between 130° C. and 140° C. for one hour. This effects the cross-linking of the silver chitosan and renders it insoluble. The heating also acts to dry the pumice.

A third example of a material according to the present invention prepared according to a method according to the present invention is as follows.

The pumice was prepared according to the second example described immediately above with an additional step of spraying the pumice with NaOH solution after removal from the vacuum vessel and before heating. This acts to neutralise the silver chitosan solution prior to heating and acts to enhance the cross-linking of the silver chitosan.

A fourth example of a material according to the present invention prepared according to a method according to the present invention is as follows.

In this method the pumice is first pre-treated with NaOH before being coated with silver chitosan. 300 gm of a 3% solution of NaOH was added to 200 gm of 2 to 3 mm diameter Pumice in a glass beaker sufficient to cover the Pumice. A vacuum was pulled on the beaker for 5 minutes, displacing air from the pumice, upon release of the vacuum the NaOH solution is drawn into the pumice. The pumice is then filtered from the NaOH solution and dried for 1 hour at 60° C.

The pumice is then placed in a beaker containing 250 g of 1% silver chitosan solution, sufficient to cover the pumice. A vacuum is then again applied to the beaker for five minutes. Air was visibly seen to be pulled from the Pumice and the vacuum was maintained until any foaming of the Silver/Chitosan solution had cleared. The Vacuum was then broken and the silver chitosan solution was visibly seen to be drawn into the Pumice. Approximately 150 g of the silver chitosan solution was taken up by the Pumice.

The excess silver chitosan solution was then filtered off and the pumice was left to dry for 12 hours at 60° C. The dried pumice, now coated and impregnated with silver chitosan, was then heated in a stirred vessel at 140° C. for 1 hour to effect the cross-linking of the silver chitosan.

Test 1

The antimicrobial material according to each of the four examples was tested for antimicrobial activity in the following manner:

37 g of 2 mm diameter pumice treated according to each of the methods set out above was sealed into a 28 mm diameter plastic tube 170 mm long.

2 litres of bacterial suspension *E. Coli* was circulated through the filter at a flow rate of 40 cc per minute, giving a flow velocity through the plastic tube of 9.4 m per hour and a residence time of the bacterial suspension in the filter bed of 1.8 min.

The suspension was circulated for 24 hrs and samples were taken at 0, 1, 2, 4, and 24 hours. The samples were enumerated and the surviving bacteria was calculated.

The results are shown below in table 1 and demonstrate a highly antibacterial effect for each example.

TABLE 1

| Log Reduction | 0 hrs | 1 | 2 | 4 | 24 |
|---|---|---|---|---|---|
| First Example | 0 | 0.3 | 0.72 | 6.05 | 5.45 |
| Second example | 0 | 0.19 | 0.26 | 0.31 | 5.48 |
| Third Example | 0 | 0 | 1.95 | 4.48 | 5.52 |
| Fourth Example | 0 | 0.04 | 0.68 | 5.34 | 5.17 |
| Control | 0 | −0.01 | −0.04 | −0.21 | 0.16 |

The control was carried out without filtration.

Test 2

The test was repeated with 120 g of 2 mm diameter pumice treated according to each of the methods set out above sealed into a 28 mm diameter plastic tube 170 mm long.

2 litres of bacterial suspension *E. Coli* was circulated through the filter at a flow rate of 40 cc per minute, which gave a flow velocity through the bed of 6.1 m/hr and a residence time of 1.7 min.

The suspension was circulated for 24 hrs and samples were taken at 0, 1, 2, 4, and 24 hours. The samples were enumerated and the surviving bacteria was calculated.

The results gave a log 2.08 reduction over 2 hrs and a log 5.83 reduction over 4 hrs which compares favourably with the previous results when the turnover cycle is taken into account. Total eradication was effected after 8 hours.

The invention claimed is:

1. A method of coating a porous material with cross-linked silver-chitosan comprising the steps of:
    a) submerging the porous material in a first vacuum vessel containing a solution comprising 1% to 4% of silver-chitosan dissolved in an organic acid and between 1% and 50% of glutaraldehyde;
    b) applying a vacuum to the first vacuum vessel to displace air from the porous material and precipitating silver chitosan on a surface of the porous material;
    c) removing the vacuum from the first vacuum vessel to return it to atmospheric pressure; and
    d) drying the porous material; and wherein
    the porous material undergoes a pre-treatment prior to step (a), the pre-treatment comprising the steps of:
        i) covering the porous material with an alkaline solution in a second vacuum vessel;
        ii) applying a vacuum to the second vacuum vessel;
        iii) removing the porous material from the second vacuum vessel and drying; and
    wherein the porous material is pumice, a porous zeolite, or a ceramic.

2. A method according to claim 1, wherein the porous material is activated carbon in granular or pellet form.

3. A method according to claim 1, wherein the solution contained in the first vacuum vessel comprises between 3% and 7% glutaraldehyde.

4. A method according to claim 1, wherein the first vessel and the second vessel are the same vessels.

5. A method of coating a porous material with cross-linked silver-chitosan comprising the steps of:
    a) submerging the porous material in a first vacuum vessel containing a solution comprising 1% to 4% of silver-chitosan dissolved in an organic acid;
    b) applying a vacuum to the first vacuum vessel to displace air from the porous material and precipitating silver chitosan on a surface of the porous material;
    c) removing the vacuum from the first vacuum vessel to return it to atmospheric pressure; and
    d) heating the porous material to a temperature between 120° C. and 140° C.; and wherein
    the porous material undergoes a pre-treatment prior to step (a), the pre-treatment comprising the steps of:
        i) covering the porous material with an alkaline solution in a second vacuum vessel;
        ii) applying a vacuum to the second vacuum vessel;
        iii) removing the porous material from the second vacuum vessel and drying; and wherein the porous material is pumice, a porous zeolite, or a ceramic.

6. A method according to claim 5, wherein in step (d) the porous material is heated to a temperature between 130° C. and 140° C.

7. A method according to claim 5, wherein in step (d) the porous material is heated for at least 30 minutes.

8. A method according to claim 6, wherein in step (d) the porous material is heated for at least one hour.

9. A method according to claim 5, wherein the porous material is pumice or a ceramic.

10. A method according to claim 5, wherein the porous material is granules or pellets of activated carbon.

11. A method according to claim 5, wherein at step (iii) the porous material is dried for at least 30 minutes at a temperature greater than 50° C.

12. A method according to claim 5, wherein the porous material undergoes a post-treatment step after the final step of the method, the post-treatment comprising the steps of:
    i) covering the porous material with an alkaline solution;
    ii) drying the porous material.

13. A method according to claim 12, wherein at step (ii) the porous material is dried for at least 30 minutes at a temperature greater than 50° C.

14. A method according to claim 5, wherein the alkaline solution is a NaOH solution, an ammonium hydroxide solution, or a sodium bicarbonate solution.

* * * * *